Oct. 10, 1939.   T. H. THOMPSON   2,175,231
SPRING LINER CONSTRUCTION
Filed Feb. 17, 1938   2 Sheets-Sheet 1
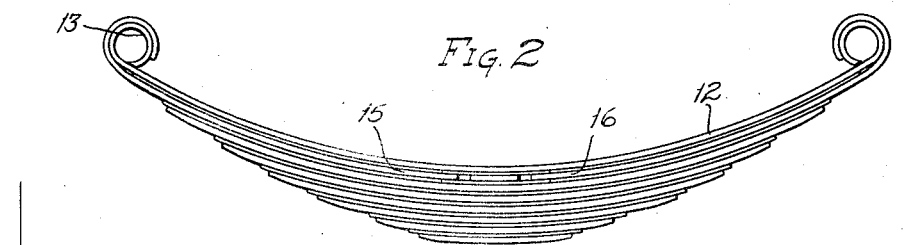
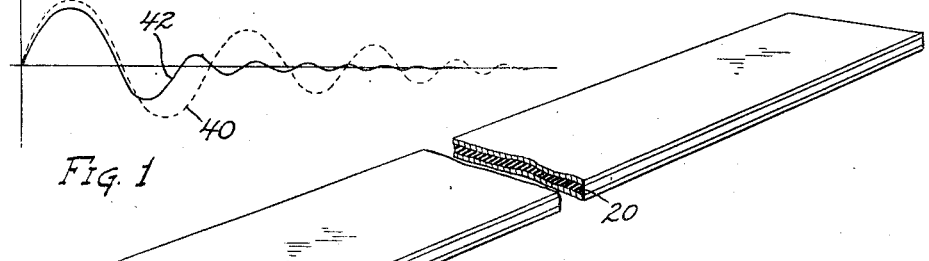
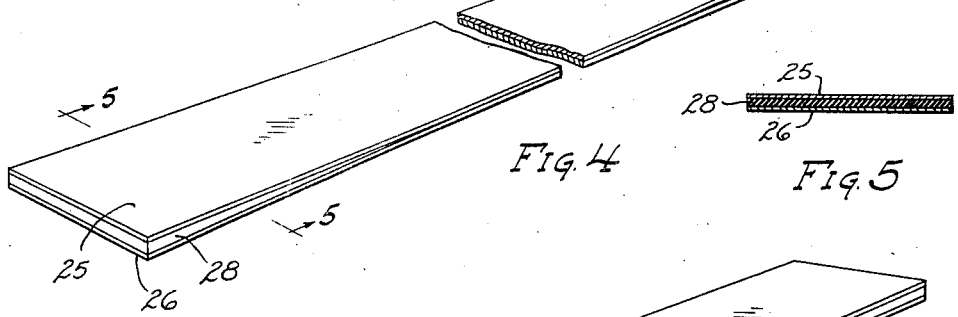
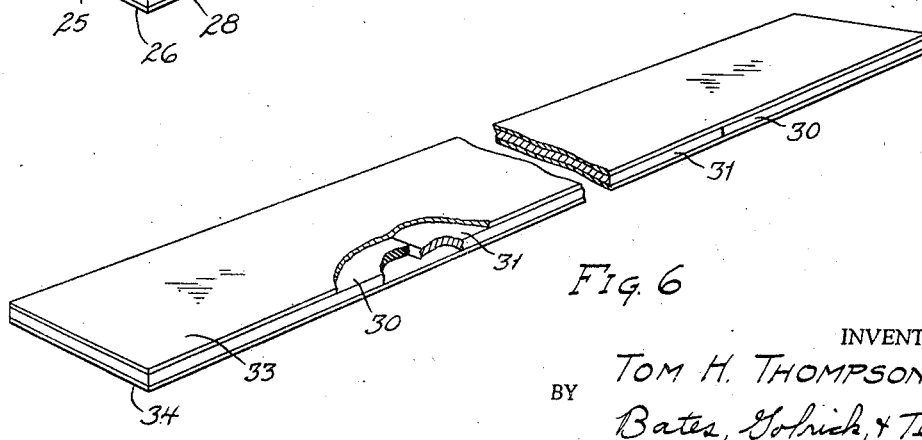
INVENTOR.
TOM H. THOMPSON
BY Bates, Goldrick, & Teare
ATTORNEYS

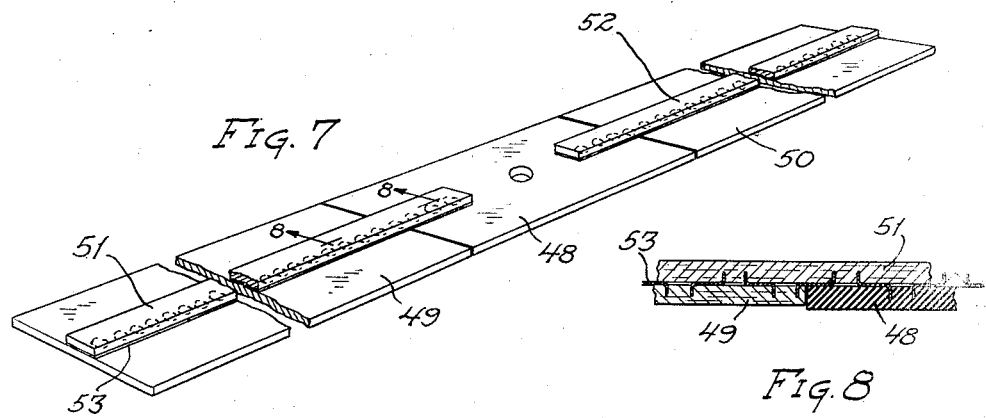
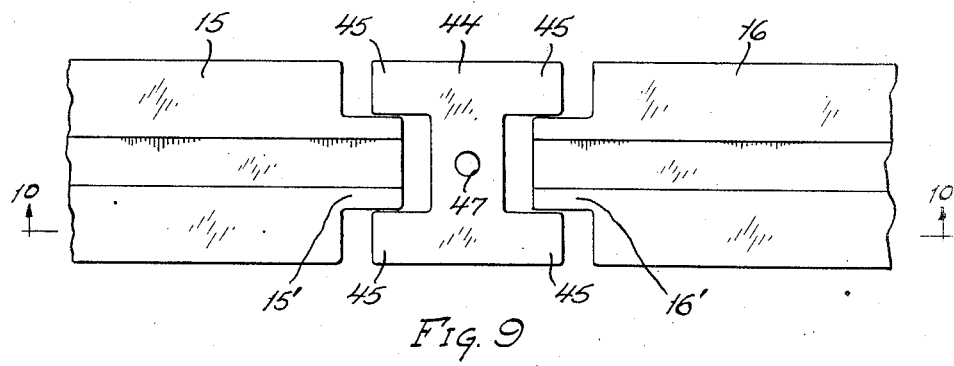
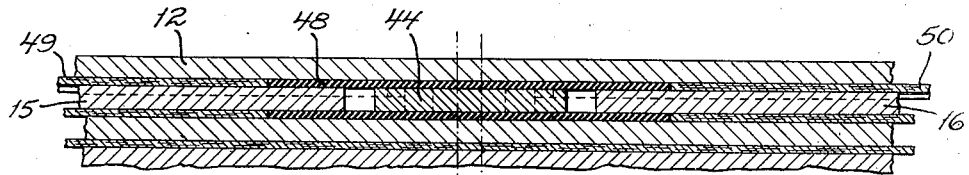
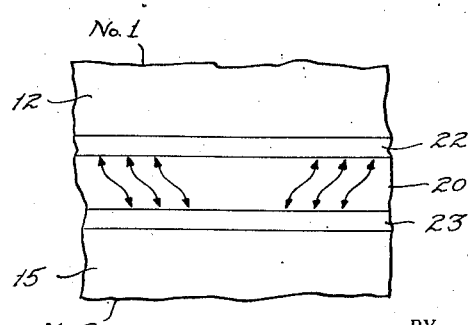

Patented Oct. 10, 1939

2,175,231

UNITED STATES PATENT OFFICE 2,175,231

SPRING LINER CONSTRUCTION

Tom H. Thompson, University Heights, Ohio, assignor to The Cleveland Graphite Bronze Company, Cleveland, Ohio, a corporation of Ohio Application February 17, 1938, Serial No. 191,042

6 Claims. (Cl. 267—47)

This invention relates to improvements in vehicle springs of the leaf spring type. The general object of the invention is to provide a vehicle spring construction, having liners inserted between the leaves of the spring of such construction that the ridability factors of the spring can be controlled when being used under variable speed, road and weather conditions.

In my United States Patent, No. 2,105,869, issued January 18, 1938, I set forth the problms encountered in producing vehicle springs which will function properly in varying climatic environments and the influence of the static and dynamic friction factors upon the performance of vehicle leaf springs. I herein disclose a spring assembly incorporating a liner construction for insertion between the leaves of the springs, the physical elements of which can be varied to be controllable in a definite, economical manner to meet any spring performance specification, regardless of the type or class of vehicle upon which the spring is to be used.

Therefore, a further object of my invention is to provide a spring liner construction formed of elements or members of different physical characteristics, and which characteristics can be varied to control and definitely predetermine the relationship of the major and minor oscillations of the spring leaves, to thereby afford a spring leaf assembly, which, when placed in use on the vehicle, will be sensitive to minor shocks and vibrations incidental to so-called "boulevard" riding conditions, and will control major shock reactions under high-speed driving conditions. The liner construction is such that a certain element or elements of the liner will function to absorb and/or control the minor spring vibrations or oscillations, during which period other parts or elements of the liner construction do not function substantially, and when the vibration and minor oscillation absorbing capacity of said material is exceeded, other elements of the liner serve to act upon opposed spring leaf faces of the spring leaves to control or decrease the number of major oscillations and thereby quickly dampen the spring action.

Such a liner construction may comprise a so-called "rubber sandwich", wherein the core or center of the liner structure, either throughout the length of the liner, or for a distance of several inches at the ends of the liner structure, comprises rubber or other suitable resilient longitudinally stretchable material, while the faces of the liner structure may comprise laminations of friction controlling material, as disclosed in the aforementioned patent, and in my copending application, Serial No. 186,571, or any other material suitable for the purpose.

A still further object of the present invention is to provide a leaf spring liner construction which will serve to shorten the dampening period of major oscillations, and which will also serve to either lengthen or shorten the minor oscillation period of a vehicle leaf spring in a continuous or uninterrupted manner, as desired.

A further object of the present invention is to provide a liner construction which will fulfill the foregoing stated objects and be adaptable to spring leaf assemblies which incorporate split spring leaves.

My invention contemplates the predetermination of the coefficient of friction of the outer laminations comprising the so-called sandwich liner, as well as the thickness, resiliency and tensile strength of the core of the sandwich liner whereby I accomplish the control of the action of a vehicle spring within the static friction limits of the usual leaf spring structure, thus causing the spring to be more sensitive to road conditions. The liner construction is such that I also can control the amount of the dampening effect upon the major oscillations set up in the spring assembly, due to major shocks or applied forces encountered when driving the vehicle over bad road conditions or when driving the vehicle at high speeds. The core of the liner comprises a cushioning means to thereby permit the spring to be responsive to minor vibrations heretofore transmitted to the vehicle body by the usual spring acting as a solid bar. Spring assemblies heretofore have been unresponsive to such minor applied forces, and the present invention is utilized in such manner that the core also may be utilized to control the minor oscillations set up in the spring under so-called "boulevard riding conditions" and also control those minor oscillations which follow dampened major oscillations set up in the spring assembly.

With the method of the present invention, reactions of the foregoing referred to forces exerted upon vehicle springs of varying performance specifications can be controlled separately. I obtain the foregoing by varying, (a) the coefficient of friction of the outer faces of the spring liners, (b) the resiliency of the core, and (c) the thickness and/or tensile strength of the core. Associated with the resilient core of the liner, and preferably attached thereto, are treated facings formed of any suitable material, such as a treated fibrous material, having within practical limits, predetermined coefficients of friction relative to opposed faces of certain of the spring leaves, whereby the liner faces will function to dampen and control the major oscillations of the spring assembly caused by major shocks, without in any way interferring with the proper functioning of the resilient core.

By a major oscillation, as distinguished from a minor oscillation as used herein, I mean any oscillation set up in the spring by the application of a force or shock to the spring assembly, which is sufficient to overcome the inherent static friction of a spring construction. In my aforementioned patent I called attention to the distinction between the static friction factor and the dynamic friction factor, characteristic of a leaf spring construction. I also set forth therein a means for decreasing the static friction factor of the spring assembly during a preliminary or break in use of a vehicle which means served thereafter to impart to the spring assembly a substantially uniform dynamic friction factor throughout the useful existence of the vehicle.

Through the use of the present invention I increase the sensitiveness of the spring without decreasing the load rating of the spring assembly; hence the invention functions within the limits of the static friction factor.

In the drawings, Fig. 1 is a representation of a graph showing the normal oscillations of a leaf spring assembly not equipped with my invention, and also the oscillatory action of a spring equipped with my invention; Fig. 2 is a side elevational view of a spring assembly incorporating my invention; Fig. 3 is a perspective view of one form of my spring liner construction; Fig. 4 is a modification of the liner construction illustrated in Fig. 3; Fig. 5 is a cross-sectional transverse view of the liner construction shown in Fig. 4, taken substantially along the line 5—5 of Fig. 4; Fig. 6 is a perspective illustration of a third form of my liner construction; Fig. 7 illustrates, in perspective, a fourth form of liner construction; Fig. 8 is a fragmentary, cross-sectional view taken substantially along the line 8—8 of Fig. 7; Fig. 9 is a plan view of the central portion of two half spring leaves, the outer ends of which are curled over the ends of the No. 1 spring leaf of the assembly, to afford a shackle bolt bearing support, and illustrating the manner of preventing lateral displacement of the inner end of the half spring leaves; Fig. 10 is a diagrammatic illustration of the liner action relative to two opposed faces of adjacent spring leaves, and Fig. 11 is a diagrammatic representation of the influence of the liner upon the minor deflecting movements of the spring.

In Fig. 2 of the drawings, I show a spring leaf assembly in which the No. 1 leaf 12 has the outer end thereof curled, as indicated by the reference numeral 13, to provide a shackle bolt bearing support. The No. 2 spring leaf of the assembly comprises half spring leaf members 15 and 16, which have the outer ends thereof curled about the outer ends 13 and 14 of the No. 1 leaf to increase the strength of the spring assembly, at the ends thereof, which engage the shackle bolts. The spring leaf assembly illustrated comprises a plurality of grooved spring leaves of varying lengths, although the present invention is not limited to springs wherein the leaves are grooved.

In the form of my spring liner illustrated in Fig. 3, the structure thereof may be in the form of a sandwich, comprising a core 20 extending throughout the length of the liner structure, formed of a resilient material having predetermined thickness, compressibility and flexibility, and is preferably formed of a rubber compound. The outer faces of the liner structure are fixed to the core and comprise laminations of a material treated to have both weather and mechanical durability, as well as to have a definite coefficient of friction, within practical limits, relative to the faces of the spring leaves between which the liner structure is placed. The laminations may comprise a fibrous material, such as paper, treated in such manner as to be weather-proof and to be durable, or the laminations may comprise facing materials such as I have disclosed in my copending application, Serial No. 108,371, or any other suitable material, economically available.

In Fig. 4 I illustrate in perspective a spring liner construction which may comprise outer facings or laminations 25 and 26 formed of a desired spring leaf contacting material, such as I have referred to hereinbefore, and disposed therebetween, for a distance of several inches from the outer ends thereof, are core pieces 28 and 29 formed of resilient material, which, if desired, may taper in cross-section.

In Fig. 6 I show a modification of the spring liner construction illustrated in Figs. 4 and 5, wherein the resilient core section members 30 are shown to be of uniform thickness, and the central portion 31, of the core, may be formed of any suitable material of substantially the same thickness as the end core sections 30. The facing laminations 33 and 34 of the structure may comprise any of the mentioned materials hereinbefore indicated. It is intended that the liner structures, illustrated in Figs. 1 to 6, inclusive, are to be used between the No. 1, No. 2, No. 3 and No. 4 spring leaves of the assembly, or they may be used between several other of the spring leaves. If desired, other liners, not of the so-called "sandwich type" may be used between several of the remaining shorter spring leaves.

When the spring assembly is subjected to vibration, not of sufficient force to exceed the inherent static friction factor of the spring assembly, that is, when the spring assembly is acting more or less as a solid bar between the axle of the vehicle and the chassis thereof, the resilient core, as, for example, the core 20 (see Fig. 11), serves as a cushion seat to absorb such vibrations. When minor deflections of the spring take place, the oscillating action of the core is indicated by the arrow head lines shown in Fig. 11. When the deflecting movements of the spring leaves are such as to exceed the longitudinal stretchability of the core material 20, relative movement between the liner facing or lamination 22 and the contacting face of the spring leaf 12, takes place, and a similar movement takes place between the face of the lamination 23 and the spring leaf 15, and by reason of the predetermined physical characteristics of the materials forming the facing laminations 22 and 23, the desired dampening effect is exerted upon the spring leaf oscillations during the major deflecting movements thereof, and by reason of the predeterminability of the coefficient of friction of the facing materials, the extent of dampening of the major oscillations of the spring movements can be obtained. For example, in the illustration in Fig. 1, the curve 40 illustrates the oscillatory movements of an uncontrolled leaf spring assembly. The curve 40 shows a prolonged action in the major oscillatory movements of the spring assembly, while the curve 42 illustrates both the major and minor oscillatory movements of the spring assembly when equipped with my spring liner device. It will be apparent that the dampening period of the major oscillation is shortened. It will be apparent that the time elements of these periods are controllable and predeterminable, as hereinbefore set forth. In some instances it may be desired to shorten the dampening period of the major oscillations and prolong the minor oscillation period, while in other instances it may be desirable to shorten also the minor oscillation period, all of which will be dependent upon the performance specifications of the spring action desired.

In Figs. 7 to 10, inclusive, I show a liner structure which is particularly adaptable for use in cooperation with the faces of the half spring leaves 15 and 16. As stated, the No. 2 leaf of the spring assembly is usually formed in halves, whereby the outer ends thereof may be curled about the curled ends of the No. 1 spring. By making the No. 2 leaf in halves relative movement between the No. 1 and No. 2 springs is permitted. To maintain the inner ends of the No. 2 spring leaf halves in proper assembled position, a means is provided for engaging the inner ends of the spring leaf halves to retain them in position while permitting a certain amount of longitudinal movement of each spring half. One form of such means is shown in Fig. 9, wherein a plate member 44, of substantially the same thickness as the spring leaf halves 15 and 16, is provided with lug portions 45 spaced apart to form central slots and the inner ends of the spring leaf halves 15 and 16 are provided with extensions 15' and 16', which loosely engage in the slots afforded in the plate 44 by the lug formations 45. The plate 44 is provided with a bolt-receiving opening 47, whereby the main bolt of the spring assembly may pass therethrough. Major deflections of the vehicle spring, when liners are included in the assembly, have a deleterious affect upon the usual liner structures. Accordingly, I provide, in the two liner structures which contact the upper and lower faces of the spring leaf half members 15 and 16, a central section 48 that will withstand the movements of the spring leaf halves 15 and 16, without interfering with the proper functioning of the spring. This section may comprise a tough material, preferably formed of a rubber compound of substantially the same thickness as the thickness of the liner sections 49 and 50 (see Fig. 7), and which may be attached to the central elements 48 in any suitable manner. In the particular spring assembly illustrated, the spring leaves, as stated, are grooved. Accordingly, I provide ribbed elements 51 and 52, which may fit into the grooves of the spring leaf half members 15 and 16, and each rib lamination may be attached to the liner members 49 and 50 by any suitable means, as, for example, a flexible binder strip 53, such as I have disclosed in my copending application, Serial No. 186,571. The liner sections 49 and 50 may comprise the liner sandwich hereinbefore disclosed, or may comprise any desired liner material.

I claim:

1. A liner for a leaf spring, comprising a plurality of laminations of materials, there being a middle lamination formed of resilient material responsive to minor movements of two adjacent spring leaves between which the liner is adapted to be placed, and an upper and a lower lamination attached to the intermediate resilient material and treated to tend to adhere respectively to opposed races of said spring leaves during said minor deflections of said spring leaves but to have movement relative to said spring-leaf faces during major deflecting action of the spring leaf.

2. A liner for a leaf spring, formed of a plurality of laminations of materials, there being a core formed of a longitudinally stretchable material responsive to the minor movements of two adjacent spring leaves between which the liner is to be placed, and upper and lower laminations of material in intimate contact with the core, said laminations having friction factors sufficiently high to cause them to tend to adhere respectively to opposed faces of said spring leaves during said minor deflections of said spring leaves, but said friction factors being sufficiently low to permit relative movement between said laminations and said spring-leaf faces during major deflecting actions of the spring leaves.

3. A liner for a leaf spring, comprising a plurality of laminations of materials, there being a middle lamination formed of resilient material responsive to minor movements of two adjacent spring leaves between which the liner is adapted to be placed, and an upper and a lower lamination in intimate contact with the intermediate resilient material adjacent the ends thereof and in intimate contact with opposed faces of said spring leaves during said minor deflections of said spring leaves but adapted to have movement relative to said spring-leaf faces during major deflecting actions of the spring leaf.

4. A liner for a leaf spring, comprising a plurality of laminations of materials, there being a middle lamination formed of resilient material responsive to minor movements of two adjacent spring leaves between which the liner is adapted to be placed, and an upper and a lower lamination attached to the intermediate resilient material and treated to have a predetermined coefficient of friction within practical limits, to thereby remain respectively immovable relative to said faces during said minor deflections of said spring leaves, but to have movement relative to said spring-leaf faces during major deflecting actions of the spring leaf.

5. A liner for a leaf spring, comprising a plurality of laminations of material, there being two laminations of relatively stiff material treated to tend to adhere to the opposed faces of two adjacent spring leaves between which the liner is adapted to be inserted during minor deflections of the spring leaves, and a liner core formed of rubber to which said laminations are attached, said treated laminations being immovable relative to the opposed faces of said adjacent spring leaves during minor deflecting movements of the spring leaves, and the rubber part of the liner being responsive to said minor deflections and serving to dampen minor oscillations created by said minor deflections, and said treated laminations having the spring leaf contacting surfaces thereof movable relative to the opposed faces of said adjacent spring leaves only during the major deflecting movements of the spring leaves.

6. A liner for a leaf spring, formed of a plurality of laminations of materials, there being cores formed of stretchable material adjacent the ends of the liner and responsive to the minor movements of two adjacent spring leaves between which the liner is to be placed, and outer laminations of material in intimate contact with the core portions, said outer laminations having friction factors sufficiently high to cause them to tend to adhere respectively to opposed faces of said spring leaves during said minor deflections of said spring leaves, but said friction factors being sufficiently low to permit relative movement between said laminations and said spring-leaf faces during major deflecting actions of the spring leaves.

TOM H. THOMPSON.